United States Patent [19]

Wei et al.

[11] 3,853,872

[45] Dec. 10, 1974

[54] 2,3,4,5-SUBSTITUTED THIAZOLES

[75] Inventors: Peter H. L. Wei, Springfield; Stanley C. Bell, Penn Valley, both of Pa.

[73] Assignee: American Home Products Corporation, New York, N.Y.

[22] Filed: May 24, 1973

[21] Appl. No.: 363,455

Related U.S. Application Data

[63] Continuation-in-part of Ser. No. 125,412, March 17, 1971, abandoned.

[52] U.S. Cl.... 260/251 A, 260/256.5 R, 260/306.7, 424/251, 424/270

[51] Int. Cl............................................. C07d 51/46

[58] Field of Search... 260/251 A, 306.7 T, 256.5 R

[56] References Cited

UNITED STATES PATENTS 3,507,869   4/1970   Houlihan et al. .................... 260/251

Primary Examiner—Raymond V. Rush
Attorney, Agent, or Firm—Vito Victor Bellino

[57] ABSTRACT

Pharmacologically active compounds have been prepared of the following general formulae:

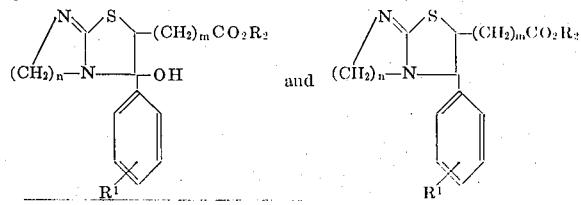

The compounds are active as CNS depressants, antitubercular agents and mood elevators.

10 Claims, No Drawings

2,3,4,5-SUBSTITUTED THIAZOLES

RELATED APPLICATIONS

This application is a continuation-in-part of copending application of Ser. No. 125,412, filed Mar. 17, 1971, and now abandoned.

BACKGROUND OF THE INVENTION

Substituted thiazoles have been prepared in the past by the two step reaction of (1) an alpha-halo ketone with an alkylene thiourea to afford a 3-hydroxy[2, 1-b]thiazole derivative, followed by (2) dehydration of the 3-hydroxy group in the presence of an acid. The first reaction step is conventionally conducted in a solvent such as acetone or a lower alkanol at a temperature from about 20° to 50°C. for a period of from about 3 to 48 hours. The second reaction step is conducted at from room temperature to about 100°C. in the presence of an acid such as hydrochloric acid, hydrobromic acid or acetic acid, optionally in the presence of a solvent such as a lower alkanol, acetone or tetrahydrofuran. Exemplary of this process is that of Houlihan et. al., U.S. Pat. No. 3,507,869.

DESCRIPTION OF THE INVENTION

This invention is concerned with the preparation of novel pharmacologically active compounds of the general formulae:

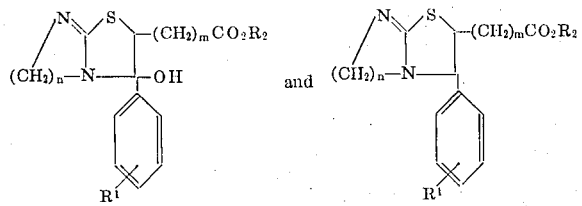

wherein $R_1$ is selected from the group consisting of hydrogen, (lower)alkyl, halogen, phenyl, trifluoromethyl, nitro, amino, and (lower)alkoxy; $R_2$ is selected from the group consisting of hydrogen and (lower)alkyl; $n$ is an integer of from two to four; $m$ is one of the integers one and two; and the pharmaceutically acceptable acid addition salts thereof.

The compounds of the invention are prepared by the following process:

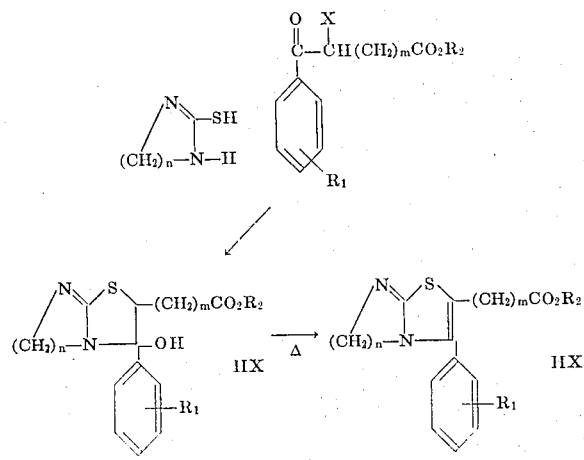

wherein $R_1$, $R_2$, $n$, and $m$ are the same as hereinabove described; and X is a halogen.

The 3-hydroxyimidazothiazole intermediates may be isolated by interrupting the process before it has progressed completely to the dehydrated product. It is to be understood that during the reaction a preponderance of the 3-hydroxyimidazothiazole is initially present, with continuing increase in the ratio of the dehydrated product as the reaction proceeds. The ratio of 3-hydroxyimidazothiazole to the dehydrated product at any given time during the reaction varies with the specific reactants and the other reaction parameters. However, optimization in the yield of either the intermediate or the unsaturated final product is readily achieved for any given system by removing an aliquot sample of the reaction mixture and determining the ratio of its components by standard means such as thin layer chromatography or infra red analysis.

Although the reaction proceeds in the presence of inorganic as well as organic acids such as hydrochloric, hydrobromic phosphoric, acetic and propionic acid, optionally in the presence of an inert solvent such as ethanol, isopropanol, acetone, tetrahydrofuran, and the like, it is preferred to employ acetic acid and more preferably glacial acetic acid because the latter acids serve as satisfactory solvents for the reaction mixture.

Thus, the preferred method of preparation comprises admixing the reactants in glacial acetic acid and heating them on a steam bath until the reaction is complete. The reaction mixture is filtered and the solvent is evaporated. The residue may then be further purified by recrystallization from an appropriate organic solvent such as acetonitrile. The reaction time needed for production of the 3-hydroxy derivatives extends from the dissolution time in the solvent employed up to about 3.5 hours at steam bath temperature. The unsaturated products result from extended heating, such as overnight on a steam bath.

In the evaluation of the biological activity of the compounds of the invention, the in vivo effects were tested as follows: Each compound tested was administered orally or intraperitoneally to three mice (14 to 24 grams) at each of the following doses: 400, 127, 40 and 12.7 milligrams per kilogram of host body weight (MPK). The animals were watched for a minimum of 2 hours during which time signs of general stimulation, (i.e., increased spontaneous motor activity, hyperactivity on tactile stimulation, twitching), general depression (i.e., decrease spontaneous motor activity, decreased respiration) and autonomic activity (i.e., miosis, mydriases, diarrhea) were noted. The date obtained, demonstrated that the compounds of the invention induce central nervous system depressant effects at a dose of 127 to 400 MPK. Thus the compounds of the invention have utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a sedative or calming effect in mammals.

In addition, the compounds evidence usefulness as effective mood elevators in that they block reserpine induced ptosis at a dosage level as low as 0.12 milligrams per kilogram body weight, a characteristic property of known mood elevators such as Amphetamine and Tofranil. This property of the compounds was determined by oral administration of each compound in a number of graded doses to groups of six mice (3 male and 3 female) followed in 1 hour by challenge with 2.5 milligrams of reserpine per kilogram body weight. The degree of ptosis for each eye was determined at 1 hour and 2 hour intervals post treatment and compared with simultaneously run control animals. The ED50 in milligrams per kilogram body weight as antagonists to reserpine ptosis for each of the specifically tested compounds is provided at the end of the title for each working example, infra. In general, a dose at or below 10 milligrams per kilogram body weight is considered to evidence very potent anti-reserpine activity.

When the compounds of the invention are employed as described above, they may be administered alone or in combination with pharmacologically aceptable carriers, the proportion of which is determined by the solubility and chemical nature of the compound, chosen route of administration and standard pharamacological practice. For example, they may be administered orally in the form of tablets or capsules containing such excipients as starch, milk sugar, calcium carbonate and the like. They may be administered orally in the form of solutions which amy contain coloring or glucose in a sufficient quantity to render the solution isotonic.

The dosage of these agents will vary with the route of administration and the particular compound chosen.

The following compounds have also demonstrated in vitro antitubercular activity at concentrations as low as the stated value:
2,3,5,6-tetrahydro-3-hydroxy-3-phenylimidazo[2,1-b]thiazole-2-acetic acid, ethyl ester, hydrobromide at 5 ug/ml;
3-(p-chlorophenyl)-2,3,5,6-tetrahydro-3-hydroxyimidazo[2,1-b]-thiazole-2-acetic acid, ethyl ester, hydrobromide at 5 ug/ml;
3-(p-chlorophenyl)-2,3,5,6-tetrahydro-3-hydroxyimidazo[2,1-b]thiazole-2-acetic acid, methyl ester, hydrobromide at 1 ug/ml; and
2,3,5,6-tetrahydro-3-hydroxy-3-phenylimidazo[2,1-b]thiazole-2-acetic acid, methyl ester, hydrobromide at 5 ug/ml.

These compounds are useful for the in vitro inhibition of M. tuberculosis. The compounds thus may be employed for example in hospitals, sanitariums and the like to effectively inhibit the causative organism of tuberculosis by contacting infected areas and materials with aqueous solutions or dispersions of said compounds. The compounds noted completely inhibit Mycobacterium tuberculosis, human type, strain H37Rv when applied as an aqueous solution of dispersion.

The terms halo and halogen are meant to identify chlorine, bromine and iodine. The term (lower)alkyl is used to include straight and branched chain hydrocarbon groups containing from 1 to 6 carbon atoms such as methyl, ethyl, i-propyl n-butyl, n-hexyl, and the like. The term (lower) alkoxy is used to include those hydrocarbonoxy groups such as methoxy, ethoxy, n-propoxy, n-butoxy, and the like. The term pharmaceutically acceptable acid is used to include non-toxic salts such as those which are formed by reaction with hydrochloric, hydrobromic, sulfuric, nitric, phosphoric, and similar acids known to the art.

The following specific examples illustrate the preparation of the 3-hydroxy compounds of this invention under neutral conditions (Examples 1A) as well as the production of 3-hydroxy compounds and the dehydrated products thereof under acidic reaction conditions (Examples 1B–9). The advantage of acidic reaction conditions being employed in the production of either the 3-hydroxy compounds or the dehydrated product thereof is self-evident. Each of the 3-hydroxy substituted compounds specifically exemplified undergo dehydration upon heating for a period up to about 16 hours as is illustrated in Example 3.

EXAMPLE 1

3-(p-Chlorophenyl)-2,3,5,6-tetrahydro-3-hydroxyimidazo[2,1-b]thiazole-2-acetic acid, hydrobromide. ED 50-0.22.

A. A dimethoxyethane solution of 2-imidazolidinethione (2.04 g, 0.02 m) and 3-bromo-3-(p-chlorobenzoyl)propionic acid (5.82 g, 0.02 m) containing 10 ml of dimethylformamide was heated on a steam bath for 2 hours. The white solid was collected and dried, and weighed 7.5 g. The crude material was recrystallized from a mixture of ethanol and dimethoxyethane. The pure hydrobromide of 3-(p-chlorophenyl)-2,3,5,6-tetrahydro-3-hydroxyimidazo[2,1-b]thiazoleacetic acid melted at 273–5°C.

Elemental Analysis for: $C_{13}H_{13}ClN_2O_3S \cdot HBr$:
Calc'd: C, 39.66; H, 3.58; Br, 20.30; Cl, 9.01; N, 7.12; S, 8.14.
Found: C, 39.56; H, 3.75; Br, 20.06; Cl, 8.90; N, 6.83; S, 8.23. The IR spectrum indicated the presence of acid group at 5.8 $\mu$ and OH at 3.15 $\mu$.

B. This compound (16 g) was also obtained by heating a glacial acetic acid solution of 3-bromo-3-(p-chlorobenzoyl) propionic acid (11.64 g, 0.04 m) and 2-imidazolidinethione (4.49 g, 0.044 m) on a steam bath for 3½ hours.

C. Additional heating of the title compound affords 3-(p-chlorophenyl)-5,6-dihydroimidazo[2,1-b]thiazole-2-acetic acid, hydrobromide.

EXAMPLE 2

3-(p-Chlorophenyl)-2,3,5,6-tetrahydro-3-hydroxyimidazo[2,1-b]thiazole-2-acetic acid, ethyl ester, hydrobromide ED50-0.27

A mixture of 3-bromo-3-(p-chlorobenzoyl)propionic acid, ethyl ester (6.5 g, 0.02 m) and 2-imidazolidinethione (2.2 g, 0.022 m) was dissolved in glacial acetic acid on a steam bath. After dissolution, the solution was filtered and the solvent was evaporated. The residue was treated with diethyl ether and the solid (7.5 g) was collected. The crude material was recrystallized from acetonitrile, m.p. 163–4°C.

Elemental analysis for $C_{15}H_{17}ClN_2O_3S \cdot Br$:
Calc'd: C, 42.72; H, 4.30; Br, 18.95; Cl, 8.41; N, 6.65; S, 7.60.
Found: C, 42.86; H, 4.03; Br, 18.56; Cl, 8.23; N, 6.62; S, 7.65.

The IR spectrum showed absorptions for OH and amine salt and 3.3 $\mu$, ester at 5.85 $\mu$, C=N at 6.25 $\mu$. The NMR spectrum (DMSO-$d_6$) showed aromatic protons at 7.7 $\sigma$, ethylene, methine, methylene and protons of the ethoxy group at 4.0 $\sigma$, methylene protons

EXAMPLE 3

3-(p-Chlorophenyl)-5,6-dihydroimidazo[2,1-b]thiazole-2-acetic acid, ethyl ester, hydrobromide ED50-3.20.

A glacial acetic acid solution of 3-bromo-3-(p-chlorobenzoyl)propionic acid, ethyl ester (6.4 g, 0.02 m) and 2-imidazolidinethione (2.2 g, 0.022 m) was heated on a steam bath overnight. After having been filtered from some insoluble material, the solvent was removed. The residual solid was slurried with dimethoxyethane and collected (7.5 g). The crude material was recrystallized from acetonitrile and the analytical sample has a melting point of 217–8°C.

Elemental analysis for $C_{15}H_{16}BrClN_2O_2S$:
Calc'd: C, 44.62; H, 4.00; N, 6.94; S, 7.96.
Found: C, 44.51; H, 3.95; N, 7.24; S, 7.78.

The IR spectrum showed absorption for ester at 5.75 $\mu$ and C=N and C=C at 6.25 $\mu$. The NMR spectrum showed aromatic protons at 7.8 $\sigma$ (s); ethylene protons at 4.4 $\sigma$ (s); acetylmethylene protons at 3.8 $\sigma$ (s) and ethoxy at 4.2 $\sigma$ (q) and 1.2 $\sigma$ (t) also exchangeable proton at 10.0 $\sigma$.

EXAMPLE 4

2,3,5,6-Tetrahydro-3-hydroxy-3-phenylimidazo[2,1-b]thiazole-2-acetic acid, ethyl ester,, hydrobromide ED50-3.90

A. By following the procedure of Example 2, and by substituting 3-benzoyl-3-bromopropionic acid, ethyl ester for 3-bromo-3-(p-chlorobenzoyl)propionic acid, ethyl ester we obtained the titled compound. The crude material (9.0 g), which was prepared from 0.04 mole of starting ester, was recrystallized from acetone, to afford the analytically pure sample, m.p. 147–9°C.

Elemental Analysis for $C_{15}H_{18}N_2O_3S \cdot HBr$:
Calc'd: C, 46.51; H, 4.95; Br, 20.64; N, 7.24; S, 8.28.

Found: C, 46.38; H, 4.94; Br, 20.52; N, 7.08; S, 8.38.

IR: OH and amine HBr, 3.3 $\mu$; ester, 5.8 $\mu$; amine HBr, 6.2 $\mu$. NMR (DMSO-d$_6$): aromatic, 7.5 $\sigma$ (m); ethoxy, 4.0 $\sigma$ (q) and 1.2 $\sigma$ (t); other aliphatic spread between 2.8 to 4.8 $\sigma$.

B. Following the prolonged heating technique of Example 3 affords 3-phenyl-5,6-dihydroimidazo[2,1-b]thiazolo-2-acetic acid, ethyl ester, hydrobromide.

EXAMPLE 5

3-(p-Chlorophenyl)-2,3,5,6-tetrahydro-3-hydroxyimidazo[2,1-b]thiazole-2-acetic acid, methyl ester, hydrobromide ED50-0.50

By following the procedure of Example 2 and by substituting the ethyl ester with methyl ester, we prepared the titled compound. From 0.0218 mole of starting ester 8.5 g of crude material was obtained. After recrystallization from methanol the compound had a melting point of 173–4°C.

Elemental Analysis for $c_{14}H_{15}ClN_2O_3S \cdot HBr$:
Calc'd: C, 41.24; H, 3.96; Br, 19.60; Cl, 8.70; N, 6.87; S, 7.86.
Found: C, 41.34; H, 3.99; Br, 19.79; Cl, 8.77; N, 6.88; S, 7.96.

IR: OH and amine HBr, 3.4 $\mu$ (b); ester, 5.85 $\mu$ (s); amine HBr, 6.3 $\mu$ (s). NMR (DMSO): aromatic, 7.6 $\sigma$ (s); OCH$_3$, 3.65 $\sigma$ (s); other aliphatic spread from 2.8 $\sigma$ to 4.8$\sigma$.

EXAMPLE 6

3-p-Chlorophenyl)-2,3,6,7-tetrahydro-3-hydroxy-5H-thiazolo-[3,2-a]pyrimidine-2-acetic acid, ethyl ester, hydrobromide ED50-0.12.

A. By following the procedure of Example 2, and by substituting 2-mercapto tetrahydropyrimidine (0.04 mole) for 2-mercaptoimidazoline we obtained the titled compound. The oily residue that remained after removal of solvent was treated with dimthoxyethane, and the crude solid weighed 16.2 g. The recrystalllized sample (from acetonitrile) melted at 180–2°C.

Elemental Analysis for $C_{16}H_{19}ClN_2O_3S \cdot HBr$:
Calc'd: C, 44.20; H, 4.40; Br, 18.38; N, 6.45; S, 7.37.

Found: C, 43.89; H, 4.65; Br, 18.37; N, 6.56; S, 7.20.

IR: OH, 3.2 $\mu$; amine HBr, 3.4 $\mu$; ester 5.75 $\mu$; amine HBr 6.1 $\mu$.
NMR (DMSO): aromatic, 7.6 $\sigma$; ethoxy, 4.0 $\sigma$ and 1.2 $\sigma$; other aliphatic spread between 2.0 to 4.4 $\sigma$.

B. Following the prolonged heating technique of Example 3 affords 3-(p-chlorophenyl)-6.7-dihydro-5H-thiazolo [3,2-a]pyrimidine-2-acetic acid, ethyl ester, hydrobromide.

EXAMPLE 7

2,3,5,6-Tetrahydro-3-hydroxy-3-phenylimidazo[2,1-b]thiazole-2-acetic acid, methyl ester, hydrobromide. ED50-0.50

By following the procedure of Example 2 and by substituting 3-benzoyl-3-bromopropionic acid, methyl ester (0.06 mole) for 3-bromo-3-(p-chlorobenzoyl)-propionic acid, ethyl ester we obtained the titled compound. The oily residue that remained after removal of solvent was dissolved in acetone. After having been filtered from some insoluble material, the filtrate yielded 16.0 g. The compound after recrystallization from acetonitrile melted at 169–70°C.

Elemental Analysis for $C_{14}H_{16}N_2O_3S \cdot HBr$:
Calc'd: C, 45.05; H, 4.59; Br, 21.41; N, 7.51; S, 8.59.

Found: C, 44.97; H, 4.55; Br, 21.30; N, 7.67; S, 8.51.

IR: OH and amine HBr, 3.3 $\mu$; ester, 5.8 $\mu$; amine HBr 6.3 $\mu$.
NMR (DMSO-d$_6$): aromatic, 7.6 $\sigma$; OCH$_3$, 3.6 $\sigma$ (s); other aliphatic spread from 2.8 $\sigma$ to 4.8 $\sigma$.

EXAMPLE 8

3-(p-Chlorophenyl)-2,3,6,7-tetrahydro-3-hydroxy-5H-thiazolo [3,2-a]pyrimidine-2-acetic acid, hydrobromide. ED50-0.25

By following the procedure B of Example 1, and by substituting 2-mercapto tetrahydropyrimidine (0.088 mole) for 2-mercaptoimidazoline, we obtained 32 g of the crude tilted compound. The sample recrystallized from acetonitrile melted at 176–7°C.

Elemental Analysis for $C_{14}H_{15}ClN_2O_3S \cdot HBr$:
Calc'd: C, 41.24; H, 3.96; Br, 19.60; Cl, 8.70; N, 6.87; S, 7.86.

Found: C, 41.24; H, 3.85; Br, 19.60; Cl, 8.69; N, 7.19; S, 8.10.

IR: OH and amine HBr, 3.3 μ; carboxylic acid, 5.8 μ; amine HBr, 6.15 μ. NMR (DMSO): aromatic, 7.6 σ; aliphatic spread between 2.1 σ to 4.4 σ.

EXAMPLE 9

3-(p-Chlorophenyl)-2,3,5,6,7,8-hexahydro-3-hydroxythiazolo-[3,2-a][1,3]diazepine-2-acetic acid, hydrobromide. ED50-98.00

A. By following the procedure B of example 1 and by substituting 2-mercapto tetrahydrodiazepine (0.044 mole) for 2-mercaptoimidazoline, we obtained the titled compound. The oily residue that was obtained after removal of the solvent was treated with acetone to give 14.0 g of the crude titled compound. The crude material recrystallized from acetonitrile gave pure product, m.p. 165–7°C.

Elemental Analysis for $C_{15}H_{17}ClN_2O_3S \cdot HBr$:
Calc'd: C, 42.72; H, 4.30; Br, 18.95; Cl, 8.41; N, 6.65; S, 7.59.
Found: C, 42.68; H, 4.43; Br, 19.03; Cl, 8.45; N, 6.84; S, 7.64.

IR: OH, 3.2 μ; amine HBr, 3.4 μ; carboxylic acid, 5.75 μ; amine HBr, 6.2 μ. NMR (DMSO): aromatic 7.7 σ; methine, 4.4 σ; 5.9 methylene, 3.7 σ; acetyl methylene, 2.6 σ; 6.7-ethylene, 2.0 σ.

B. Following the prolonged heating technique of Example 3 affords 3-(p-chlorophenyl)-5,6,7,8-tetrahydro-thiazolo-[3,2-a-][1,3]diazepine-2-acetic acid, hydrobromide.

EXAMPLE 10

3-(p-Ethylphenyl)-2,3,5,6-tetrahydro-3-hydroxyimidazo[2,1-b]thiazolo-2-acetic acid, hydrobromide.

Following the procedure of Example 1 (B), with the exception that 3-bromo-3(p-ethylbenzoyl)propionic acid is reacted with 2-imidazolidinethione,, affords the title compound.

EXAMPLE 11

3-(o-Isopropylphenyl)-2,3,5,6-tetrahydro-3-hydroxyimidazo[2,1-b]thiazole-2-acetic acid, ethyl ester, hydrobromide.

Following the procedure of Example 2, with the exception that 3-bromo-3(o-isopropylbenzoyl)propionic acid, ethyl ester is reacted with 2-imidazolidinethione, affords the title compound.

EXAMPLE 12

3-(Biphenylyl-2,3,5,6-tetrahydro-3-hydroxyimidazo[2,1-b]thiazole-2-acetic acid, hydrobromide.

Following the procedure of Example 1 (B), with the exception that 3-bromo-3-(p-phenylbenzoyl)propionic acid is reacted with 2-imidazolidinethione, yields the title compound.

EXAMPLE 13

3-(p-Trifluoromethylphenyl)-2,3,5,6-tetrahydro-3-hydroxyimidazo [2,1-b]thiazole-2-acetic acid, hydrobromide.

The title compound is obtained following the procedure of Example 1 (B) by reacting 3-bromo-3(p-trifluoromethylbenzoyl)-propionic acid with 2-imidazolidinethione.

EXAMPLE 14

3-(p-Nitrophenyl)-2,3,5,6-tetrahydro-3-hydroxyimidazo[2,1-b]thiazole-2-acetic acid, ethyl ester, hydrobromide.

The title compound is produced by reacting 3-bromo-3(p-nitrobenzoyl)propionic acid, ethyl ester with 2-imidazolidinethione following the procedure of Example 2.

EXAMPLE 15

3-(p-Aminophenyl)-2,3,5,6-tetrahydro-3-hydroxyimidazo[2,1-b]thiazole-2-acetic acid, hydrobromide.

The title compound is produced by hydrogenation of the product of Example 14 or by reaction of 3-bromo-3(p-aminobenzoyl)propionic acid with 2-imidazolidinethione following the procedure of Example 1 (B).

EXAMPLE 16

3-Anisyl-5,6-dihydroimidazo[2,1-b]thiazole-2-acetic acid, ethyl ester, hydrobromide.

The title compound is prepared by reacting 3-bromo-3-anisoyl-propionic acid, ethyl ester with 2-imidazolidinethione in accordance with the procedure of Example 3.

What is claimed is:

1. A compound selected from the group consisting of those of the formulae:

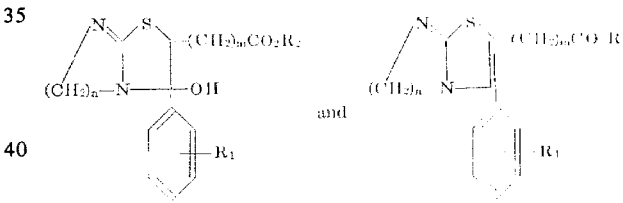

wherein $R_1$ is selected from the group consisting of hydrogen, (lower)alkyl, halogen and trifluoromethyl;
$R_2$ is selected from the group consisting of hydrogen and (lower)alkyl;
n is an integer of from two to four, inclusive;
m is the integer one or two; and the pharmaceutically acceptable acid salts thereof.

2. A compound, as set forth in claim 1 which is: 3-(p-chlorophenyl)-2,3,5,6-tetrahydro-3-hydroxyimidazo[2,1-b]thiazole-2-acetic acid, hydrobromide.

3. A compound, set forth in claim 1 which is: 3-(p-chlorophenyl)-2,3,5,6-tetrahydro-3-hydroxyimidazo[2,1-b]thiazole-2-acetic acid, ethyl ester, hydrobromide.

4. A compound, as set forth in claim 1, which is: 3-(p-chlorophenyl)-5,6-dihydroimidazo[2,1-b]thiazole-2-acetic acid, ethyl ester, hydrobromide.

5. A compound, as set forth in claim 1, which is: 2,3,-5,6-tetrahydro-3-hydroxy-3-phenylimidazo[2,1-b]thiazole-2-acetic acid, ethyl ester, hydrobromide.

6. A compound, as set forth in claim 1, which is: 3-(p-chlorophenyl)-2,3,5,6-tetrahydro-3-hydroxyimidazo[2,1-b]thiazole-2-acetic acid, methyl ester, hydrobromide.

7. A compound, as set forth in claim 1, which is 3-(p-chlorophenyl)-2,3,6,7-tetrahydro-3-hydroxy-5H-thiazolo[3,2-a]pyrimidine-2-acetic acid, ethyl ester, hydrobromide.

8. A compound, as set forth in claim 1, which is: 2,3,5,6-tetrahydro-3-hydroxy-3-phenylimidazo[2,1-b]thiazole-2-acetic acid, methyl ester, hydrobromide.

9. A compound, as set forth in claim 1, which is: 3-(p-chlorophenyl)-2,3,6,7-tetrahydro-3-hydroxy-5H-thiazolo[3,2-a]pyrimidine-2-acetic acid, hydrobromide.

10. A compound, as set forth in claim 1 which is: 3-(p-chlorophenyl)-2,3,5,6,7,8-hexahydro-3-hydroxythiazolo[3,2-a][1,3]diazepine-2-acetic acid, hydrobromide.

* * * * *